J. S. RANDOLPH.
TROLLEY WHEEL.
APPLICATION FILED JAN. 16, 1913.

1,078,643.

Patented Nov. 18, 1913.

Joseph S. Randolph,
Inventor

Witnesses by C. A. Snow & Co.
Attorneys

UNITED STATES PATENT OFFICE.

JOSEPH SCOTT RANDOLPH, OF GLENCOE, OHIO.

TROLLEY-WHEEL.

1,078,643.  Specification of Letters Patent.  Patented Nov. 18, 1913.

Application filed January 16, 1913. Serial No. 742,511.

*To all whom it may concern:*

Be it known that I, JOSEPH S. RANDOLPH, a citizen of the United States, residing at Glencoe, in the county of Belmont and State of Ohio, have invented a new and useful Trolley-Wheel, of which the following is a specification.

The present invention aims to provide novel means for holding a trolley wire upon a trolley wheel.

The invention aims, further, to provide novel means whereby the holding mechanism may be moved, to permit the trolley wheel to be shifted.

Another object of the invention is to provide novel means for controlling the movement of one of the elements which serves to hold the trolley wheel in contact with the conducting wire.

It is within the scope of the invention to improve generally and to increase the utility of devices of that type to which the present invention appertains.

With the foregoing and other objects in view which will appear as the description proceeds the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
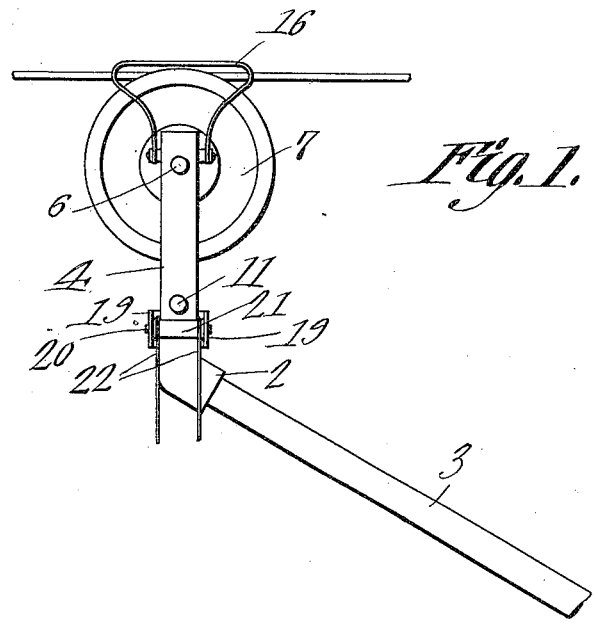
Figure 2:
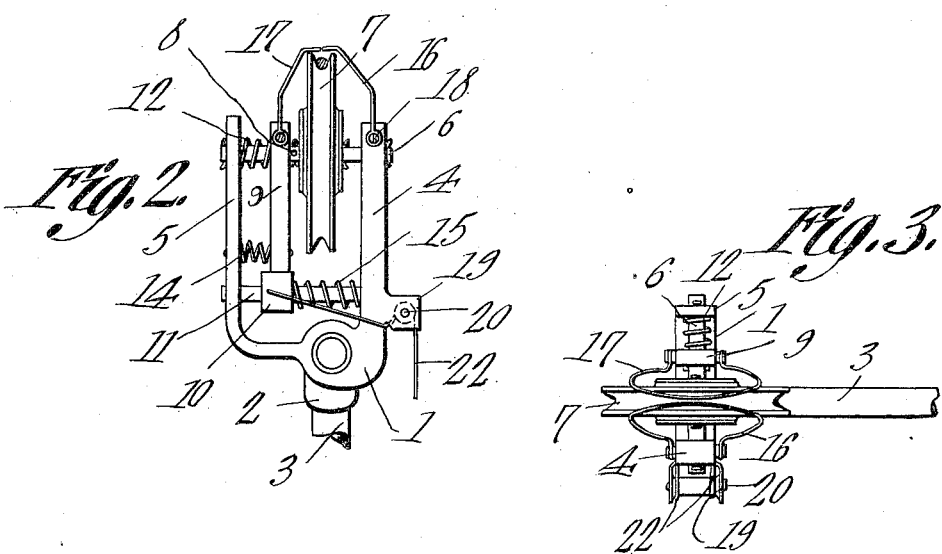
Figure 3:
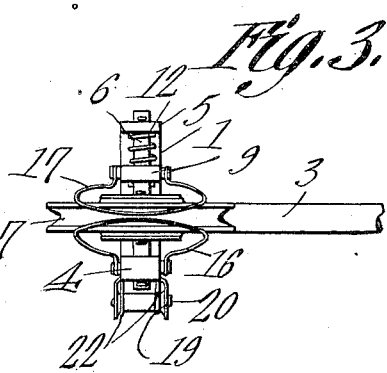

In the drawings:—Figure 1 shows the invention in side elevation; Fig. 2 is an end elevation; and Fig. 3 is a top plan.

In carrying out the invention there is provided a support comprising a U-shaped frame 1, connected as shown at 2 with the trolley pole 3. The frame 1 includes arms 4 and 5.

Mounted in the frame 1 adjacent the upper end thereof, is an axle 6 supporting the rotatable trolley wheel 7. A pin 8 extends through the axle 6 and constitutes a fulcrum for a lever 9, the upper end of which is loosely mounted on the axle 6. At its lower end, the lever 9 is equipped with a head 10 fitting loosely upon a support, preferably taking the form of a rod, the support, indicated by the numeral 11, being terminally connected with the arms 4 and 5 of the frame 1.

A compression spring 12 surrounds the axle 6 and bears against the lever 9, one end of the spring 12 abutting against the arm 5. A compression spring 14 is connected with the arm 5 and bears against the lever 9. Another compression spring 15 surrounds the support 11, the spring 15 abutting at one end against the arm 4 and at its other end abutting against the head 10 of the lever 9. The springs 14 and 15 serve to support the lever 9 yieldably upon the member 10, in the position shown in Fig. 2. The spring 12 serves to press the lever 9 against the fulcrum pin 8.

A fixed jaw 16 is carried by the upper end of the arm 4 and a movable jaw 17 is carried by the upper end of the lever 9. The jaws 16 and 17 are of loop shape and overhang the tread of the trolley wheel 7 so as to hold the conductor therein, when the parts are positioned as shown in Fig. 2.

Supporting elements 18 are mounted in the edges of the lever 9 and of the arm 4, the supporting elements engaging the ends of the loop shaped, converging jaws 16 and 17.

The arm 4 is provided with outstanding ears 19 supporting a shaft 20, carrying a drum 21. A pair of flexible elements 22 are trained about the drum 21, the free ends of the flexible elements 22 extending downwardly, and the flexible elements, at one end, each being connected with the head 10 of the lever 9.

When the parts are positioned as shown in Fig. 2, the jaws 16 and 17 will, under the action of the springs 12, 14 and 15, remain in overhanging relation with respect to the tread of the trolley wheel 7, and thus, the conductor will be held in the tread of the trolley wheel. When it is desired to disengage the trolley wheel from the conductor, the flexible elements 22 may be drawn upon, sliding the lever 9 upon the support 11 and putting the spring 15 under tension. When the lever 9 slides on the support 11, the pin 8 which is carried by the axle 6 will constitute a fulcrum, and the lever will tilt, thereby swinging the movable jaw 17 to one side of the trolley wheel, so that the trolley wheel may be disengaged readily from the conductor. When the tension upon the flexible elements 22 is released, the springs will co-act to restore the parts to the positions shown in Fig. 2.

Having thus described the invention, what is claimed is:—

In a device of the class described, a support; a trolley wheel journaled on the support; a lever fulcrumed upon the support and provided with a jaw overhanging the trolley wheel; separate resilient means for restraining the swinging movement of the lever in opposite directions; and means under the control of an operator for swinging the jaw laterally with respect to the trolley wheel, against the action of one of said resilient means.

In testimony that I claim the foregoing as my own, I have hereto affixed my signature in the presence of two witnesses.

JOSEPH SCOTT RANDOLPH.

Witnesses:
 JAMES D. MELLOTT,
 T. W. MELLOTT.